Figure 1:
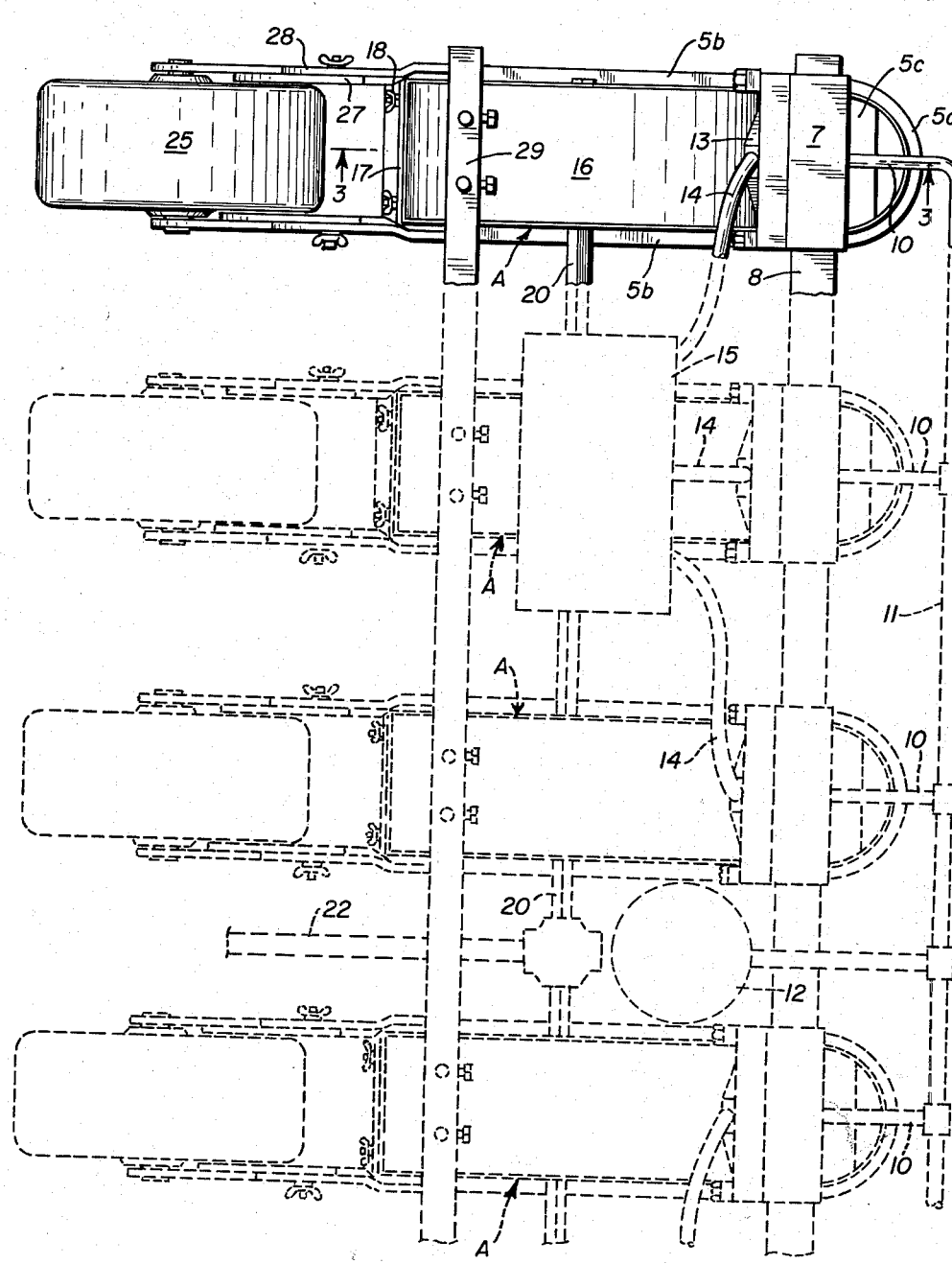

INVENTOR.
George E. Walters

July 13, 1965   G. E. WALTERS   3,194,193
SYSTEM AND APPARATUS FOR PREPARING SOIL FOR ROW CROP PLANTING
Filed Feb. 13, 1963   2 Sheets-Sheet 2

INVENTOR.
George E. Walters
BY

ATTORNEYS

United States Patent Office 3,194,193
Patented July 13, 1965

3,194,193
SYSTEM AND APPARATUS FOR PREPARING SOIL FOR ROW CROP PLANTING
George E. Walters, Denver, Colo., assignor to The Great Western Sugar Company, Denver, Colo., a corporation of New Jersey
Filed Feb. 13, 1963, Ser. No. 258,264
14 Claims. (Cl. 111—6)

This invention relates to soil preparation for row crop seed planting, and it has particular application to a novel method of incorporating pre-emergence weed killer chemicals into plant rows prior to or in conjunction with planting seed along the row.

Many row crops, including sugar beets, are planted in rows with predetermined uniform spacing between rows. Usually, the planter mechanism is tractor drawn and of the multiple row type. Other apparatus used in later stages of the growing operation, such as blockers, thinners, and cultivators, conform to the row spacing and have multiple unit which are tractor drawn, and operate along the row or between rows according to the functions performed.

Weed control is a very important factor in growing row crops, particularly sugar beets. The spacing of rows and spacing interval of plants in the row are preselected or predetermined to provide maximum yield per acre based on maximum utilization of the soil and optimum soil condition and availability for each plant. Consequently, if weeds are permitted to grow in proximity to plants, such plants are crowded and deprived of maximum utilization of the soil during their growing period.

Formerly, much of the soil cultivation and weed control was manual. At the present time, labor costs are so high that in most areas, all or most of the soil preparation, planting, cultivation and harvesting procedures are mechanized. One of the chief difficulties with mechanical cultivation, particularly weed elimination, is in removing weeds located in close proximity to plants without damage to the plants.

In recent years, chemicals have been developed which will eliminate weeds without damage to the plants. Most of these are prepared as solutions and the usual method of application to the soil is by spraying the entire planted area. Such solutions dissipate rapidly on or in the soil, particularly when the area receives frequent rainfall or irrigation. Recent studies of the use of such chemicals prepared in granular form have established that the granular material generally is more effective in the soil over longer periods. However, unless it is applied in a way which effects substantial soil penetration before wetting or dissolution, the effectiveness of the granular material is adversely effected by too much available water which induces rapid evaporation and dissolution.

The aforesaid studies also have established that distribution of the chemical in either form over the entire planted area is wasteful and inefficient as to that portion of the application which is deposited on or enters the soil at any substantial distance from the plant row. For example, in sugar beet culture, the row spacing is generally 22 inches, although in some areas a spacing of 24 inches is standard. Investigation has demonstrated that the chemical, if applied in a band or strip of 7 inch width with the seeds planted substantially on the center line of the strip, will provide effective weed control throughout the entire width of the strip and easy and effective mechanical cultivation between rows by the conventional mechanical procedures. In order to prevent damage to plants, the chemical must not be applied in excess quantities and requires uniform distribution in the soil in order to avoid rapid evaporation and obtain proper fixation and elimination of clod formations which dilute the effect of the chemical when left undisturbed.

It is an object of my invention to provide a simple, economical and efficient method of distributing pre-emergence weed killer chemicals uniformly in the soil to a predetermined depth along a band or strip in which the seeds forming a plant row are planted following or in conjunction with such soil preparation operation.

Another object of my invention is to provide simple, durable and efficient gang-type chemical applicators providing plural row treatment in an established plant row spacing conforming to the pattern of other equipment used in the row crop planting and cultivation operations and which may be drawn by such equipment.

A further object of the invention is to provide apparatus for row crop conditioning which provides a high degree of control of the depth and distribution of either liquid or granular type weed killer chemicals during simultaneous application along multiple rows.

Other objects reside in novel details of construction and novel combinations and arrangements of parts of the apparatus utilized in the novel soil conditioning procedures of my invention preparatory to seed planting along multiple rows.

My invention provides several innovations over practices heretofore in use for soil preparation with pre-emergence weed killer chemicals. Such innovations include novel procedures for applying such chemicals simultaneously to a plurality of plant rows including uniform distribution in the soil along each row to a predetermined depth, coupled with controls for deposit of uniform quantities of the chemical throughout the length of each row. Other innovations reside in novel structural arrangements permitting movement of the plurality of chemical application devices by the same transport vehicle that is utilized in seed planting operations along the same plurality of rows. When desired, the seed planting procedure may be combined in the same vehicular movement as a following procedure to the novel soil preparation practices.

The apparatus arrangements provide a removal of clods, stalks and similar foreign matter disposed along the intended row as a preliminary and in conjunction with the chemical distribution action. Such action includes an agitation of the top surface of the soil along the intended row as a part of the chemical distribution to the preselected depth and with shielding or confining of the area immediately above the agitated portion so as to prevent unintended scattering of deposited chemical outside the intended path of distribution because of wind currents or similar disturbances.

Another feature of the apparatus arrangement is the provision for release from the enclosure of oversize material disposed on the treated row and a subsequent reduction of such oversize material in the final soil firming action of the apparatus. When weather and soil conditions permit, the completion of the soil preparation action as aforesaid leaves the row in condition for seed planting and a planter assembly can be carried on the rear portion of the vehicle moving the soil preparation units so that seed planting follows immediately after completion of the soil preparation.

However, when because of weather, moisture, or other causes it is not feasible to perform the seed planting immediately after completion of soil preparation, the final soil firming action produces a visible pattern along the row which will remain visible for fairly long periods of time. Consequently, the advantages of the soil preparation are not lost even when the seed planting is not performed for days or weeks after completion of the soil preparation operation.

Figure 2:
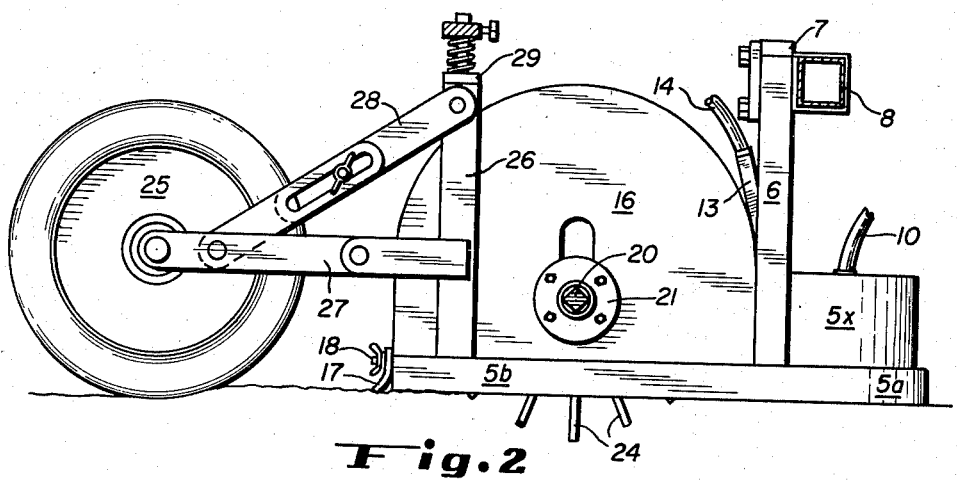
Figure 3:
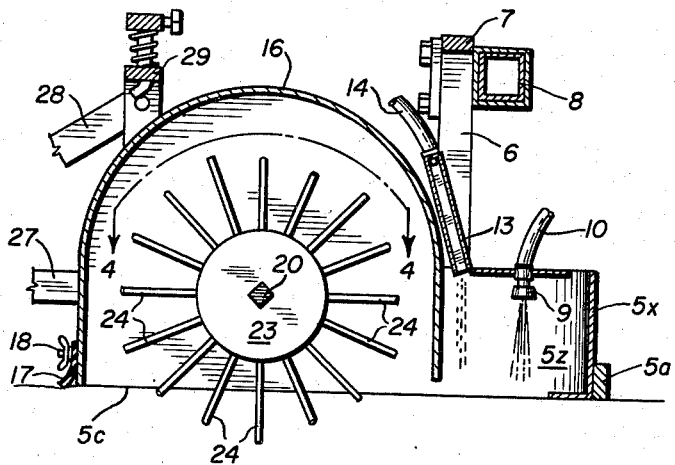
Figure 4:
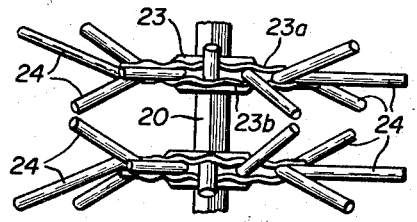

The practice of my invention will be described with reference to the accompanying drawings illustrating apparatus embodying novel features of my invention and well suited for performing the novel methods of the invention. In the drawings, in the several views of which like parts bear similar reference numerals, FIG. 1 is a fragmentary view of a six-row chemical applicator unit designed for mounting on a farm tractor and showing one such applicator unit in top plan view with three additional units shown by dash line representation and including portions of the chemical distributing system and indicating a driving arrangement including a power take-off connection to the tractor;

FIG. 2 is an end elevation of an applicator unit of the type shown in FIG. 1;

FIG. 3 is a fragmentary vertical section through the applicator unit of FIG. 2 taken along the line 3—3, FIG. 1; and FIG. 4 is a plan view of the agitator assembly of FIGS. 2 and 3 viewed from approximately the position of the dash lines 4—4 of FIG. 3.

FIG. 1 shows a fragmentary assembly of chemical applicator units embodying features of my invention representing a six row unit with the location of four of the six applicators indicated and two end units omitted in order to show the spacing arrangement on a larger scale. Each applicator unit A comprises a forward base portion 5 having a narrow or rounded front end 5a, parallel sides 5b and an open bottom 5c. An upright connector 6 extends from base portion 5 and has means such as clamping device 7 for selective mounting of the applicator on a draw bar 8 for the assembly so as to establish the desired spacing between such units.

The forward portion 5a has an upright wall 5x defining an enclosure 5z having an open top and a nozzle 9 extends into the forward portion of the enclosure for spreading discharge of a liquid such as a chemical weed killer solution delivered thereto through a conduit 10 and header 11 from a suitable source of supply such as the tank or reservoir 12 (FIG. 1). Granular weed killer chemical may be deposited within the enclosure through a spreader outlet 13 of a conduit 14 in connection with a suitable source of supply, such as supply hopper 15 (FIG. 1).

A dome-like housing 16 covers the base portion 5 rearwardly of enclosure 5z and carries a flexible flap 17 adjustably held by a suitable fastening 18 such as a nut and bolt. The flap is disposed to drag over the area along the strip acted on by agitating and distributing mechanism contained in housing 16. Such mechanism includes an elongated drive shaft 20 extending through the several housings 16 of the assembly and supported at its ends in adjustable bearing members 21 (FIG. 2) permitting selective elevation and mounting of the shaft before any period of operation. The shaft is driven by a suitable take-off connection 22 with the power unit of the tractor on which the assembly is mounted.

An agitator and distributor unit of the type referred to has been illustrated in FIG. 4 and comprises a pair of tine-supporting members 23 on the shaft 20 spaced to provide close clearance between the innermost tine surfaces. Each of the members 23 comprises two disc or plate members 23a and 23b secured on the shafts and having grooved or corrugated surfaces clampingly engaging the ends of a plurality of radially disposed tines 24 which have their outer ends bent with the bends of adjoining tines disposed at different angles so as to provide a ground penetrating contact throughout substantially the entire area of the enclosure in each revolution of the agitator unit. The tines are of such length that the selective location of the shaft 20 as previously described provides a substantial degree of soil penetration in each revolution. The housing 16 at its forward face terminates in ground clearing relation so that chemical deposited on the soil within enclosure 5z is undisturbed by the housing in the advance of the unit along the row.

A press wheel 25 having a substantially flat tread surface is connected to upright supports 26 on the base portion 5 with a pulling connection 27 partially supported by an adjustable link 28 in pivotal connection with a spring assembly 29 at the top of support member 26. This arrangement permits the press wheel 25 to be selectively adjusted in ground contacting relation to provide the desired amount of firming of the band or strip of soil subjected to the soil preparation treatment. In addition, the wheel provides an elevating component for base portion 5 which is dragged along the row but not permitted to penetrate the surface soil to any appreciable depth. The mounting of flat 17 also may be adjusted in accordance with the established elevation of the press wheel so that the flap functions effectively to confine chemical, dust and fine soil within the enclosure of housing 16, but will flex sufficiently to pass clods or larger sized lumps which are immediately contacted by the press wheel and crushed or reduced to a suitable state of fineness.

In a typical operation with an assembly as previously described, the draw bar 8 is connected to supporting structure of a tractor and the base portion 5 rests upon the surface of the soil over which the unit is moved. The agitator units are rotated at a uniform rate provided by the power drive and weed killer chemical is supplied to the enclosure 5x at a rate determined by the movement of the tractor along the row. In this connection, suitable valves or other controls are provided to govern the discharge rate of liquid flow into nozzle 9, if liquid is supplied, or through the spreader outlet 13 if granular chemical is being distributed. The spreading action of nozzle 9 or spreader 13 provides a uniform discharge over the entire width of the enclosure and the upright wall member 5x prevents any disturbance of such discharge by blowing which would result in unequal distribution.

In the advancing movement, the rounded forward portion 5a of the base rides along the top surface of the soil and any large obstructions such as clods, stalks or the like are moved to the side of the row where they will not interfere with moisture conditions or plant growth. This action provides a surface containing only fine soil on which the chemical is deposited and the lower end of the forward wall of housing 16 provides sufficient clearance so that the deposited chemical is undistributed as it is brought within the enclosure of housing 16 by the advance of the unit. It will be understood that the soil in the field has had the usual preparation for planting prior to the chemical application and except under extreme weather conditions the sub-surface soil will be essentially free of clods or large lumps.

In the continuing advance, the tines 24 are driven in a soil penetrating movement including lengthwise and lateral agitation of the soil which is penetrated to a predetermined or preselected depth and this agitation serves to distribute the deposited chemical uniformly throughout the agitated area. Also, by the control of feed rate, a uniform quantity of chemical is so distributed at each increment along the row. The combined agitation and distributing action loosens the soil acted on to such an extent that it is in a soft fluffy condition and in so doing the surface of the treated area is elevated to some extent.

The rear wall of housing 16 and the associated flap exert a leveling action on the raised soil and as previously described small lumps or clods which may have been moved out of the soil in the agitation are released on the surface by flexing of flap 17 and are thereafter immediately crushed by the weight and movement of press wheel 25. The flat tread surface of the wheel presses the surface soil in a level pattern and the weight and force exerted by the wheel flatten the surface of the strip so that it is at a lower elevation than adjoining soil along the row. This pressing action prevents too rapid evaporation of sub-surface moisture and is sufficiently firm to prevent blowing or scattering by normal wind or rainfall conditions.

The strip so formed is of uniform width throughout its length because of the confined character of the operations performed by the apparatus. It provides a visible pattern which persists for long periods and when planting is done at a later time than the soil conditioning, the visible pattern enables the tractor operator to locate the planter pattern essentially along the center line of the strip.

While the soil conditioner apparatus illustrated in the drawings is well suited for performing the novel method and procedure of my invention when either granular or liquid chemical is being applied, it will be understood that it is merely exemplary of the various structural arrangements which may be utilized for this purpose. The arrangement and shaping of parts comprising the base portion of the conditioner assembly may be varied substantially while still providing the same functioning.

As an example, the forward portion of the base member has been shown as rounded, but might be tapering with a rounded apex or triangular, and the open bottom arrangement therein also may be varied. The drawings illustrate a preferred arrangement in which the forward bottom portion is closed for a short distance to function as a skid member while the remainder of the forward enclosure is open to permit spreading of the deposited chemical. However, a completely open bottom will give satisfactory results.

In the preceding description, reference has been made to introduction of either granular or liquid chemical herbicide. Under some conditions, it may be desirable to combine the soil conditioning operation with soil fertilization, in which case it will be preferable to feed the herbicide in granular form and the fertilizer material as a solution. Care must be exercised in combining such procedures, as too much chemical in contact with young plants immediately after germination may cause a burning and is to be avoided. Preferably, the valving controls of the unit are regulated in relation to the rate of travel so as to effect a uniform distribution of chemical along the row. However, any other regulation which provides uniform distribution may be provided in place of the valves.

In preferred practice, the assembly will be of the four row or six row type with a common drive, but it will be understood that a single unit or a lesser plurality may be provided where the planting requirements do not cover large areas. Other changes and modifications may be availed of within the spirit and scope of the invention as defined in the hereunto appended claims.

I claim:

1. Soil conditioning apparatus, comprising supporting structure adapted to be mounted on a self-propelled vehicle, a plurality of conditioner assemblies secured on the supporting structure at established plant row spacing intervals, each said assembly comprising a hollow base member having upstanding walls and an open bottom in ground-contacting position with its lengthwise axis in substantial alinement with an established plant row and having a forward portion shaped to move loose material laterally from the surface soil along the path of movement of the apparatus and thereby level said path, means for introducing chemical herbicide in uniform increments into the leveled soil within the forward portion, the base member and forward portion confining the herbicide to a spread pattern of a selected width, a dome-like housing on the base member rearwardly of the forward portion defining an enclosed conditioning zone shielded from wind currents, a press wheel supported by the base member in alinement therewith at its rear, said wheel having a flat tread surface disposed in ground-contacting position at a lower elevation than the soil level in the conditioning zone, a drive shaft carried on the supporting structure and extending through the plurality of housings, a conditioner member mounted on the drive shaft for rotation within each housing and comprising a circumferential arrangement of radially disposed tines in spaced rows for soil penetration to a predetermined depth in each revolution, and the ends of adjoining tines being at different angles laterally of the path of rotation whereby the soil enclosed in the conditioning zone and deposited chemical are contacted by the tines throughout substantially the width of the enclosure and the chemical is substantially uniformly distributed through loosened soil to the predetermined depth before the soil is firmed by the following press wheel to a lower level than adjoining untreated soil along the treated band or strip so formed.

2. Soil conditioning apparatus, comprising supporting structure adapted to be mounted on a self-propelled vehicle, a plurality of conditioner assemblies secured on the supporting structure at established plant row spacing intervals, each said assembly, comprising a hollow base member having upstanding walls and an open bottom in ground-contacting position with its lengthwise axis in substantial alinement with an established plant row and having a forward portion shaped to move loose material laterally from the surface soil along the path of movement of the apparatus and thereby level said path, means for introducing chemical herbicide in uniform increments onto the leveled soil within the forward portion, the base member and forward portion confining the herbicide to a spread pattern of a selected width, a dome-like housing on the base member rearwardly of the forward portion defining an enclosed conditioning zone, a flexible flap member adjustably secured on the rear of the housing at its base for dragging contact with the surface of the conditioned plant row, a press wheel supported by the base member in alinement therewith at its rear, said wheel having a flat tread surface disposed in ground-contacting position at a lower elevation than the soil level in the conditioning zone, a drive shaft carried on the supporting structure and extending through the plurality of housings, a conditioner member mounted on the drive shaft for rotation within each housing and comprising a circumferential arrangement of radially disposed tines in spaced rows for soil penetration to a predetermined depth in each revolution, and the ends of adjoining tines being at different angles laterally of the path of rotation whereby the soil enclosed in the conditioning zone and deposited chemical are contacted by the tines throughout substantially the width of the enclosure and the chemical is substantially uniformly distributed through loosened soil to the predetermined depth before the soil is firmed by the following press wheel to a lower level than adjoining untreated soil along the treated band or strip so formed.

3. Soil conditioning apparatus, comprising supporting structure adapted to be mounted on a self-propelled vehicle, a plurality of conditioner assemblies secured on the supporting structure at established plant row spacing intervals, each said assembly comprising a hollow base member having upstanding walls and an open bottom in ground-contacting position with its lengthwise axis in substantial alinement with an established plant row and having a forward portion shaped to move loose material laterally from the surface soil along the path of movement of the apparatus and thereby level said path, means for introducing chemical herbicide in uniform increments onto the leveled soil within the forward portion, the base member and forward portion confining the herbicide to a spread pattern of a selected width, a dome-like housing on the base member rearwardly of the forward portion defining an enclosed conditioning zone and terminating at its forward end in spaced relation to the soil level within the forward portion, a press wheel supported by the base mmeber in spring-urged alinement therewith at its rear, said wheel having a flat tread surface disposed in ground-contacting position at a lower elevation than the soil level in the conditioning zone, a drive shaft carried on the supporting structure and extending through the plurality of housings, a conditioner member mounted on the drive shaft for rotation within each housing and comprising a circumferential arrangement of radially disposed tines in spaced rows for soil penetration to a predetermined depth in each revolution, and the ends of adjoining tines being at different angles laterally of the path of rotation whereby the soil enclosed in the conditioning zone and deposited chemical are contacted by the tines throughout substantially the width of the enclosure and the chemical is substantially uniformly distributed through loosened soil to the predetermined depth before the soil is firmed by the following press wheel to a lower level than adjoining untreated soil along the treated band or strip so formed.

4. Soil conditioning apparatus, comprising supporting structure adapted to be mounted on a self-propelled vehicle, a plurality of conditioner assemblies secured on the supporting structure at established plant row spacing intervals, each said assembly comprising a hollow base member having upstanding walls and an open bottom in ground-contacting position with its lengthwise axis in substantial alinement with an establishment plant row and having a forward portion shaped to move loose material laterally from the surface soil along the path of movement of the apparatus and thereby level said path, means for introducing chemical herbicide in uniform increments onto the leveled soil within the forward portion, the base member and forward portion confining the herbicide to a spread pattern of a selected width, a dome-like housing on the base member rearwardly of the forward portion defining an enclosed conditioning zone and terminating at its forward end in spaced relation to the soil level within the forward portion, a press wheel supported by the base member in alinement therewith at its rear, said wheel having a flat tread surface disposed in ground-contacting position at a lower elevation than the soil level in the conditioning zone, a drive shaft carried on the supporting structure and extending through the plurality of housings, a conditioner member mounted on the drive shaft for rotation within each housing and comprising a circumferential arrangement of radially disposed tines in two parallel rows for soil penetration to a predetermined depth in each revolution, and the ends of adjoining tines being at different angles laterally of the path of rotation whereby the soil enclosed in the conditioning zone and deposited chemical are contacted by the tines throughout substantially the width of the enclosure and the chemical is substantially uniformly distributed through loosened soil to the predetermined depth before the soil is firmed by the following press wheel to a lower level than adjoining untreated soil along the treated band or strip so formed.

5. Soil conditioning apparatus, comprising supporting structure adapted to be mounted on a self-propelled vehicle, a plurality of conditioner assemblies secured on the supporting structure at established plant row spacing intervals, each said assembly comprising a hollow base member having upstanding walls and an open bottom in ground-contacting position with its lengthwise axis in substantial alinement with an established plant row and having a forward portion shaped to move loose material laterally from the surface soil along the path of movement of the apparatus and thereby level said path, means for distributing granular chemical herbicide in uniform increments over the leveled soil within the forward portion, the base member and forward portion confining the herbicide to a spread pattern of a selected width, a dome-like housing on the base member rearwardly of the forward portion defining an enclosed conditioning zone and terminating at its forward end in spaced relation to the soil level within the forward portion, a press wheel supported by the base member in alinement therewith at its rear, said wheel having a flat tread surface disposed in ground-contacting position at a lower elevation than the soil level in the conditioning zone, a drive shaft carried on the supporting structure and extending through the plurality of housings, a conditioner member mounted on the drive shaft for rotation within each housing and comprising a circumferential arrangement of radially disposed tines in spaced rows for soil penetration to a predetermined depth in each revolution, and the ends of adjoining tines being at different angles laterally of the path of rotation whereby the soil enclosed in the conditioning zone and deposited chemical are contacted by the tines throughout substantially the width of the enclosure and the chemical is substantially uniformly distributed through loosened soil to the predetermined depth before the soil is firmed by the following press wheel to a lower level than adjoining untreated soil along the treated band or strip so formed.

6. Soil conditioning apparatus, comprising supporting structure adapted to be mounted on a self-propelled vehicle, a plurality of conditioner assemblies secured on the supporting structure at established plant row spacing intervals, each said assembly comprising a hollow base member having upstanding walls and an open bottom in ground-contacting position with its lengthwise axis in substantial alinement with an established plant row and having a forward portion shaped to move loose material laterally from the surface soil along the path of movement of the apparatus and thereby level said path, means for distributing liquid chemical herbicide over the soil within the forward portion, the base member and forward portion confining the herbicide to a spread pattern of a selected width, a dome-like housing on the base member rearwardly of the forward portion defining an enclosed conditioning zone and terminating at its forward end in spaced relation to the soil level within the forward portion, a press wheel supported by the base member in alinement therewith at its rear, said wheel having a flat tread surface disposed in ground-contacting position at a lower elevation than the soil level in the conditioning zone, a drive shaft carried on the supporting structure and extending through the plurality of housings, a conditioner member mounted on the drive shaft for rotation within each housing and comprising a circumferential arrangement of radially disposed tines in spaced rows for soil penetration to a predetermined depth in each revolution, and the ends of adjoining tines being at different angles laterally of the path of rotation whereby the soil enclosed in the conditioning zone and deposited chemical are contacted by the tines throughout substantially the width of the enclosure and the chemical is substantially uniformly distributed through loosened soil to the predetermined depth before the soil is firmed by the following press wheel to a lower level than adjoining untreated soil along the treated band or strip so formed.

7. Soil conditioning apparatus, comprising supporting structure adapted to be mounted on a self-propelled vehicle, a plurality of conditioner assemblies secured on the supporting structure at established plant row spacing intervals, each said assembly comprising a hollow base member having upstanding walls and an open bottom in ground-contacting position with its lengthwise axis in substantial alinement with an established plant row and having a forward portion shaped to move loose material laterally from the surface soil along the path of movement of the apparatus and thereby level said path, means for distributing a selected amount of chemical herbicide over the soil within the forward position, the base member and forward portion confining the herbicide to a spread pattern of a selected width, a dome-like housing on the base member rearwardly of the forward portion defining an enclosed conditioning zone and terminating at its forward end in spaced relation to the soil level within the forward portion, a of the forward portion defining an enclosed conditioning zone and terminating at its forward end in spaced relation to the soil level within the forward position, a flexible flap member secured on the rear of the housing at its base for dragging contact with the surface of the conditioned plant row, a press wheel supported by the base member in alinement therewith at its rear, said wheel having a flat tread surface disposed in ground-contacting position at a lower elevation than the soil level in the conditioning zone, a drive shaft carried on the supporting structure and extending through the plurality of housings, a conditioner member mounted on the drive shaft for rotation within each housing and comprising a circumferential arrangement of radially disposed tines in spaced rows for soil penetration to a predetermined depth in each revolution and the ends of adjoining tines being at different angles laterally of the path of rotation whereby the soil enclosed in the conditioning zone and deposited chemical are contacted by the tines throughout substantially the width of the enclosure and the chemical is substantially uniformly distributed through loosened soil to the predetermined depth before the soil is firmed by the following press wheel to a lower level than adjoining untreated soil along the treated band or strip so formed.

8. A system for preparing soil for row crop planting, comprising means for moving a plurality of chemical herbicide applicators simultaneously along and in continuous contact with a plurality of predetermined crop rows of a field to be planted, means associated with each applicator for shielding the interior portion thereof from wind currents, means for distributing a chemical herbicide in uniformly spread increments in the forward end of the shielded interior and in a quantity regulated to the rate of movement along the row, means at the forward end of each applicator for moving loose material laterally from the row and for leveling the row in advance of herbicide distribution, said shielding means limiting the spread herbicide pattern to a predetermined width on each row, means for subjecting the uniformly spread herbicide to lengthwise and lateral agitation in soil penetrating movement along and throughout the pattern within the interior portion so as to distribute it substantially uniformly to a predetermined depth below the surface of the pattern, and means for firming the agitated soil and distributed herbicide in the pattern immediately following the agitation means.

9. A system for preparing soil for row crow planting, comprising means for moving a plurality of chemical herbicide applicators simultaneously along and in continuous contact with a plurality of predetermined crop rows of a field to be planted, means associated with each applicator for shielding the interior portion thereof from wind currents, means for distributing a granular chemical herbicide in uniformly spread increments in the forward end of the shielded interior and in a quantity regulated to the rate of movement along the row, means at the forward end of each applicator for moving loose material laterally from the row and for leveling the row in advance of herbicide distribution, said shielding means limiting the spread herbicide pattern to a predetermined width on each row, means for subjecting the uniformly spread herbicide to lengthwise and lateral agitations in soil penetrating movement along and throughout the pattern within the interior portion so as to distribute it substantially uniformly to a predetermined depth below the surface of the pattern, and means for firming the agitated soil and distributed herbicide in the pattern immediately following the agitation means.

10. A system for preparing soil for row crop planting, comprising means for moving a plurality of chemical herbicide applicators simultaneously along and in continuous contact with a plurality of predetermined crop rows of a field to be planted, means associated with each applicator for shielding the interior portion thereof from wind currents, means for distributing a liquid chemical herbicide in uniformly spread increments in the forward end of the shielded interior and in a quantity regulated to the rate of movement along the row, means at the forward end of each applicator for moving loose material laterally from the row and for leveling the row in advance of herbicide distribution, said shielding means limiting the spread herbicide pattern to a predetermined width on each row, means for subjecting the uniformly spread herbicide to lengthwise and lateral agitations in soil penetrating movement along and throughout the pattern within the interior portion so as to distribute it substantially uniformly to a predetermined depth below the surface of the pattern, and means for firming the agitated soil and distributed herbicide in the pattern immediately following the agitation means.

11. In mobile soil conditioning apparatus, a hollow base member having upstanding walls and an open bottom in ground-contacting position and having its forward portion shaped to move loose material laterally from the surface soil along the path of movement of the apparatus and thereby level said path, means for distributing a chemical herbicide in uniform increments onto the leveled soil within the base member at its forward end, said base member forming a confined zone shielded from wind currents and limiting the distributing herbicide to a pattern of selected width, agitating means within the confined zone rearwardly of the distributing means enclosed from wind currents and constructed and arranged to penetrate the soil within the base to a predetermined depth and impart lengthwise and lateral force along the pattern so as to loosen the soil and uniformly distribute chemical deposited within the base member through a predetermined soil depth, and means disposed rearwardly of the base member and movable therewith in lengthwise alinement for pressing the loosened soil to a lower elevation than its level within the base member.

12. In mobile soil conditioning apparatus, a hollow base member having upstanding walls and an open bottom in ground-contacting position and having its forward portion shaped to move loose material laterally from the surface soil along the path of movement of the apparatus and thereby level said path, means for distributing a chemical herbicide in uniform increments onto the leveled soil within the base member at its forward end, said base member forming a confined zone shielded from wind currents and limiting the distributing herbicide to a pattern of selected width, agitating means within the confined zone rearwardly of the distributing means enclosed from wind currents and constructed and arranged to penetrate the soil within the base to a predetermined depth and impart lengthwise and lateral force along the pattern so as to loosen the soil and uniformly distribute chemical deposited within the base member through a predetermined soil depth, and adjustable means disposed rearwardly of the base member and movable therewith in lengthwise alinement for pressing the loosened soil to a selective lower elevation than its level within the base member.

13. In mobile soil conditioning apparatus, a hollow base member having upstanding walls and an open bottom in ground-contacting position and having its forward portion shaped to move loose material laterally from the surface soil along the path of movement of the apparatus and thereby level said path, means for distributing a chemical herbicide in uniform increments onto the leveled soil within the base member at its forward end, said base member forming a confined zone shielded from wind currents and limiting the distributing herbicide to a pattern of selected width, agitating means within the confined zone rearwardly of the distributing means enclosed from wind currents and constructed and arranged to penetrate the soil within the base to a predetermined depth and impart lengthwise and lateral force along the pattern so as to loosen the soil and uniformly distribute chemical deposited within the base member through a predetermined soil depth, means for varying the depth of penetration of the agitating means, and means disposed rearwardly of the base member and movable therewith in lengthwise alinement for pressing the loosened soil to a lower elevation than its level within the base member.

14. In mobile soil conditioning apparatus, a hollow base member having upstanding walls and an open bottom in ground-contacting position and having its forward portion shaped to move loose material laterally from the surface soil along the path of movement of the apparatus and thereby level said path, means for distributing a chemical herbicide in uniform increments onto the leveled soil within the base member at its forward end, said base member forming a confined zone shielded from wind currents and limiting the distributing herbicide to a pattern of selected width, agitating means within the confined zone rearwardly of the distributing means enclosed from wind currents and constructed and arranged to penetrate the soil within the base to a predetermined depth and impart lengthwise and lateral force along the pattern so as to loosen the soil and uniformly distribute chemical deposited within the base member through a predetermined soil depth, means at the rear of the base member for smoothing soil loosened by the agitating means, and means disposed rearwardly of the base member and movable therewith in lengthwise alinement for pressing the smoothed soil to a lower elevation.

References Cited by the Examiner
UNITED STATES PATENTS

| | | | |
|---|---|---|---|
| 992,140 | 5/11 | Anderberg et al. | 111—6 |
| 1,571,481 | 2/26 | Kasmeier. | |
| 1,777,391 | 10/30 | Brewer | 111—7 |
| 2,509,627 | 5/50 | Bickerton et al. | |
| 2,556,072 | 6/51 | Dewey | 111—1 |
| 2,754,622 | 7/56 | Rohmert | 111—1 |
| 2,881,848 | 4/59 | Liston | 172—548 X |
| 3,029,879 | 4/62 | Wells | 172—112 |
| 3,037,470 | 6/62 | Watson et al. | 111—1 X |

ABRAHAM G. STONE, *Primary Examiner.*
WILLIAM A. SMITH III, *Examiner.*